April 2, 1946.  C. F. VOYTECH  2,397,634
AUTOMATIC TRANSMISSION
Filed Oct. 19, 1943  2 Sheets-Sheet 1
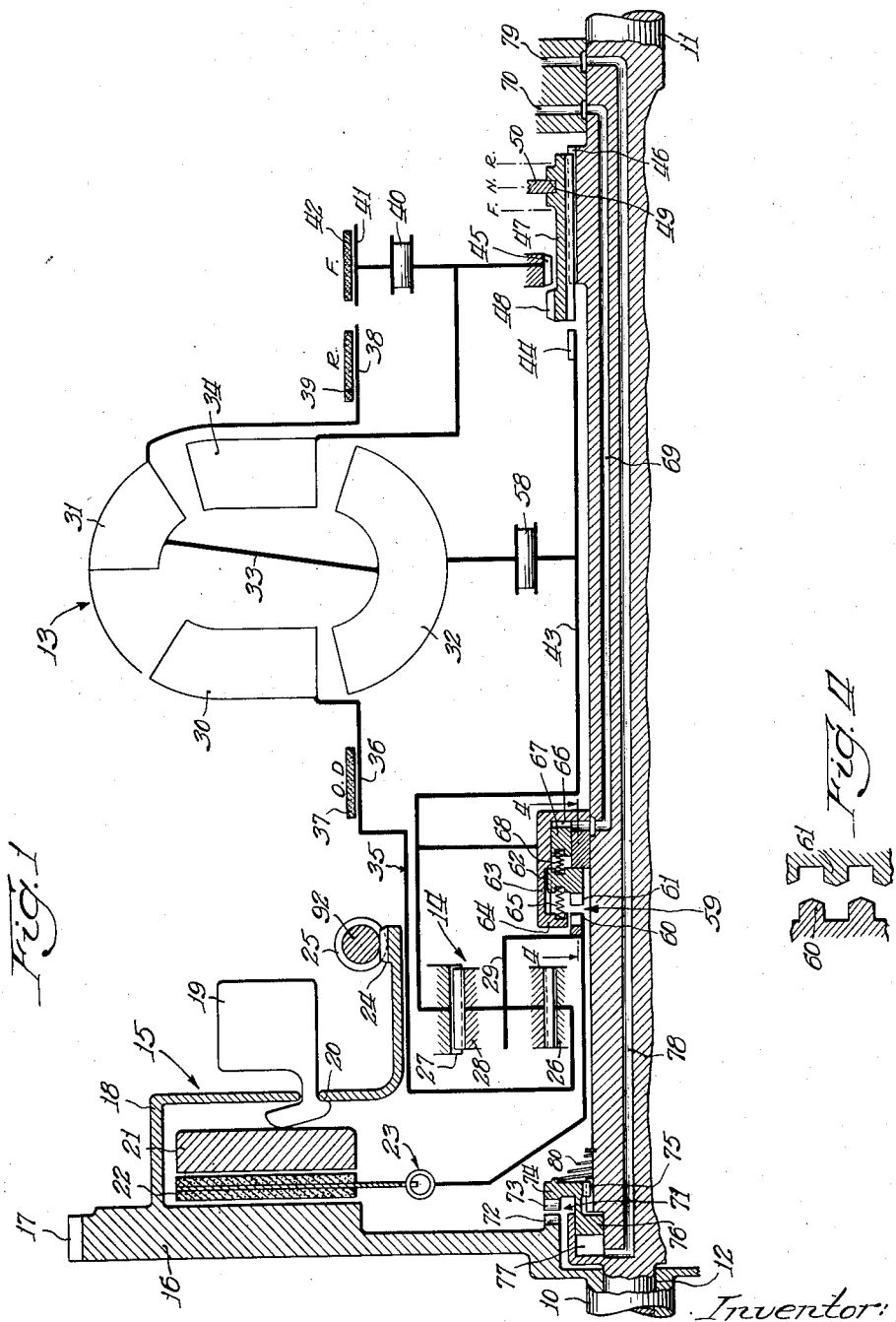
Inventor:
Charles F. Voytech
By: Edward C. Fitzhugh
Atty.

April 2, 1946.　　　C. F. VOYTECH　　　2,397,634
AUTOMATIC TRANSMISSION
Filed Oct. 19, 1943　　　2 Sheets-Sheet 2
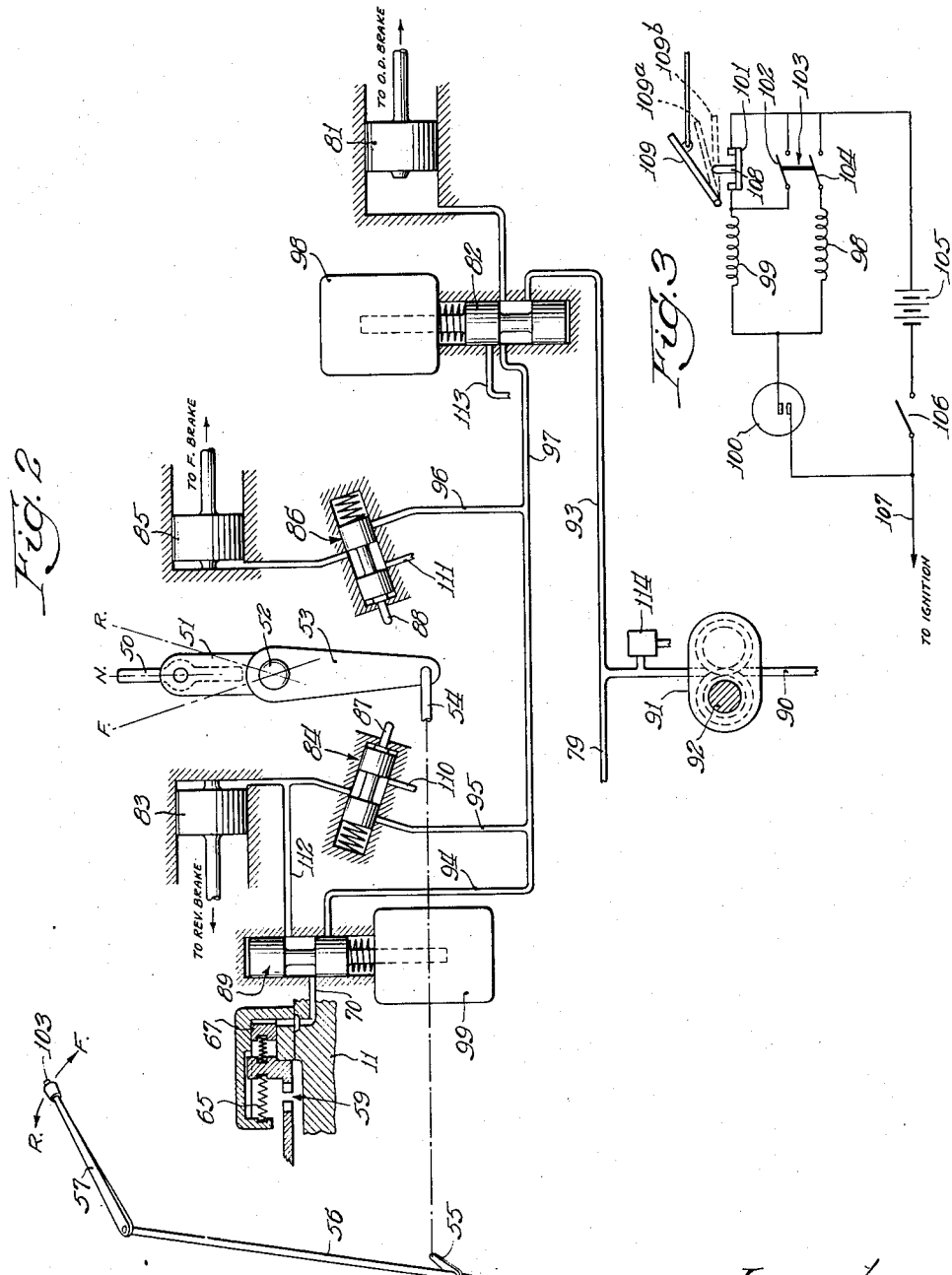
Inventor:
Charles F. Voytech
By: Edward C. Gutzbaugh Patented Apr. 2, 1946

2,397,634

UNITED STATES PATENT OFFICE 2,397,634

AUTOMATIC TRANSMISSION

Charles F. Voytech, Chicago, Ill., assignor to Borg-Warner Corporation, Chicago, Ill., a corporation of Illinois Application October 19, 1943, Serial No. 506,843

12 Claims. (Cl. 74—189.5)

This invention relates to power transmitting devices and particularly to infinitely variable torque multiplying devices combined with gearing. In some of its forms and aspects this invention relates particularly to hydrodynamic devices combined with gearing.

Although the smoothness with which a hydrodynamic torque converting device transmits torque at infinitely varying ratio from a predetermined maximum to unity is well known, it is also well known that the efficiency of such a device likewise varies and seldom exceeds 90% under the most favorable circumstances. This defect has caused designers to incorporate devices which by-pass the torque converter when no torque multiplication is required and which provide a parallel, more efficient path to be used with the converter when the latter is multiplying torque. Thus an efficient arrangement which has been proposed comprises a hydraulic torque converter combined with planetary gearing in such a manner that for high torque demand part of input power passes through the gearing directly to the driven shaft and the remainder passes through the gearing to the converter and thence to the driven shaft, with means for locking up the planetary gearing to provide a 100% mechanical drive between the input and output shafts when no torque multiplication is required.

Modern automobile engines however are preferably provided with a 3.5 ratio rear axle if direct drive is the highest speed obtainable through the transmission, or with a ratio of 4.25 if the top speed is an overdrive. Thus in the transmission last referred to, a 3.5 axle ratio is required which means that power must be transmitted through the converter at substantially all times during ordinary city driving and furthermore that the characteristics of the converter must be such that it will convert torque over a very large range of speeds both of which requirements are difficult to meet. To correct this deficiency therefore, an overdrive ratio should be supplied and the rear axle ratio changed to 4.25, but this change would of course normally increase the complexity of the transmission as well as the number of parts to such an extent that it would render inadvisable the use of the infinitely variable torque converter at all.

It is also known that a reverse drive may be obtained through a converter without altering the direction of drive of the pump element thereof, merely by interchanging the functions of the turbine and stator or reaction elements. It has been proposed to incorporate this reversing feature in a two-path-and-direct-drive arrangement, it being thought necessary however, prior to the present invention, to utilize a secondary planetary gear set to recombine the two paths of power and to make possible the interchange of functions.

Considering the foregoing desirable features in a torque converter, and the desirable features which a transmission designed for use with present automobiles should have, the principal object of this invention is to provide a transmission incorporating a hydraulic torque converter combined with gearing in a two-path relationship, with means for obtaining a reverse drive through the converter, said combination utilizing fewer gears than the devices heretofore proposed.

A more specific object of this invention is to provide a transmission wherein a hydraulic torque converter and a planetary gear set are combined to furnish a two-path drive of infinitely varying torque ratios under heavy torque conditions, a 100% mechanical direct drive for medium torque conditions, and a 100% mechanical overdrive for light torque conditions.

Another object of this invention is to provide a transmission comprising a hydraulic torque converter combined with a single planetary gear set with means for securing a reverse drive through the combination as well as two-path forward drive.

A still further object of this invention is to provide a transmission of the torque converter and planetary gear set type which will produce the functions and ratios normally required of a transmission in present day automobiles and which nevertheless requires no complicated control mechanism.

A still more specific object of this invention is to provide a simple control mechanism, incorporating both automatic and manual features, for the combination torque converter and single planetary transmission above described.

These and other objects of this invention will become apparent from the following detailed description when taken together with the accompanying drawings in which:

Fig. 1 is a schematic diagram of the principal elements of this transmission;

Fig. 2 is a schematic diagram of the hydraulic and mechanical controls for the transmission of Fig. 1;

Fig. 3 is a schematic wiring diagram of the electrical controls for the said transmission; and Fig. 4 is a fragmentary development of a clutch taken generally along lines 4—4 of Fig. 1.

Referring now to Fig. 1 for a detailed description of the invention, the transmission is comprised of a drive shaft 10 adapted to receive power from a prime mover such as an internal combustion engine (not shown), a driven shaft 11 which passes completely through the transmission and is piloted at 12 in drive shaft 10, a hydraulic torque converter 13, a planetary gear set 14 and an automatic clutch 15 which disconnects the transmission from the drive shaft 10 at speeds corresponding to idling speeds of the prime mover.

Automatic clutch 15 is mounted on a flywheel 16 having formed thereon a starting gear 17 and drivably supporting a clutch cover 18. Supported in and driven by said cover 18 are weights 19 which are adapted to pivot at 20 on housing 18 to move a clutch pressure plate 21 toward flywheel 16 thereby frictionally driving a clutch driven disc 22. Said driven disc 22 may be of any well known construction and may incorporate a vibration dampening device 23 in the hub section thereof. Clutch cover 18 is also provided with a worm 24 which drives a worm wheel 25 and shaft 92 to supply rotative power to a pump the purposes of which are to be described hereinafter.

Planetary gear set 14 is comprised of a sun gear 26, a ring gear 27, and one or more planet gears 28 meshing with the ring and sun gears and mounted on a planet carrier 29. Said carrier 29 is driven directly by clutch driven disc 22.

Hydraulic torque converter 13 is comprised of a vaned pump element 30, a first stage of turbine vanes 31, a second stage of turbine vanes 32 connected to the first stage 31 by a central web 33, and a vaned reaction or stator element 34. A direct connection 35 is provided between pump element 30 and sun gear 26 so that the two are constrained to operate together. Said connection 35 is provided with a brake drum 36 with which a brake band 37 is adapted to cooperate to arrest the rotation of sun gear 26 and its associated pump element 30. The first turbine stage 31 is connected to a drum 38 with which a brake band 39 is adapted to cooperate to arrest the rotation of both the first and second stages 31 and 32 respectively, of the turbine elements. Reaction element 34 is connected through a one-way device 40, such for example as the roller-and-cam mechanism frequently used as a freewheel device, to a brake drum 41 with which a brake band 42 is adapted to cooperate. One-way device 40 is so arranged that it will not permit reverse rotation of reaction element 34 relative to brake drum 41 but will permit such reaction element to rotate freely forwardly with respect to said drum.

Ring gear 27 of planetary gear set 14 is connected to an intermediate shaft 43 which is concentric with shaft 11 and freely rotatable thereon. Said intermediate shaft 43 is provided at its right hand end (Fig. 1) with external splines 44. Reaction element 34 is also directly connected to internal splines 45 which are spaced from external splines 44. Shaft 11 is likewise provided with external splines 46 on which is slidably mounted an internally splined sleeve 47, said sleeve being provided with external splines 48 at one end thereof which are adapted to mesh with internal splines 45 in one position of sleeve 47 to provide a direct connection between reaction element 34 and driven shaft 11. Sleeve 47 is also adapted to be moved to the left (Fig. 1) to engage external splines 44 with its internal splines to provide a direct connection between intermediate shaft 43 and driven shaft 11. Sleeve 47 may also be moved to the intermediate position shown in Fig. 1 wherein it is free of both sets of teeth 44 and 45. The three positions of sleeve 47 just described correspond to reverse, forward and neutral settings, respectively. A groove 49 is provided in sleeve 47 to receive a shift fork 50 (Fig. 2), said shift fork being pivoted in a lever 51 mounted on a shaft 52 and adapted to be operated by an external lever 53, connected by a rod 54 to a lever 55 at the steering column. Said lever 55 is directly connected to a rod 56 which in turn is operated by a hand lever 57 positioned beneath the steering wheel (not shown) of the vehicle.

Second turbine stage 31 is also connected through a one-way clutch 58 to intermediate shaft 43, the one-way clutch being so arranged that intermediate shaft 43 may rotate faster than turbine 31 but the latter may not rotate faster than the intermediate shaft.

A clutch 59 is provided for connecting carrier 29 to ring gear 27 to lock up the gear set in direct drive, which also in effect, connects drive shaft 10 with driven shaft 11. Said clutch 59 is comprised of a set of clutch teeth 60 mounted on carrier 29, and a cooperating toothed annulus 61 splined at 62 to a cylinder 63 rotatable with driven shaft 11. Both sets of teeth have double chamfers as shown in Fig. 4. An abutment 64 is provided at the end of cylinder 63 and a spring 65 is compressed between said abutment and the teeth 61 so as to tend to maintain clutch 59 in a disengaged position. An annular opening 66 is provided in a cylinder 63 in which is disposed an annular piston 67, said piston being spaced from annulus 61 by a spring 68 which is stronger than spring 65. Shaft 11 is provided with a conduit 69 which connects annular opening 66 with an exterior conduit 70 through which fluid under pressure may be conducted to the opening to control the operation of clutch 59.

Although clutch 59 provides a direct connection between shafts 10 and 11, the connection is dependent upon the operation of automatic clutch 15 so that should flywheel 16 be rotated at a speed less than the cut-in speed of clutch 15, clutch 59 would be ineffectual to connect driven shaft 11 with drive shaft 10.

In order to provide a connection between drive shaft 10 and driven shaft 11 when clutch 15 is disengaged, a second positive clutch 71 is provided. This clutch is comprised of a set of teeth 72 on drive shaft 10, a cooperating set of ratchet teeth 73 on a slidable clutch member 74 which is splined at 75 to driven shaft 11 and is integral with an annular piston 76 concentrically mounted with respect to shaft 11. Said shaft 11 is formed with an annular opening 77 to receive said piston 76, opening 77 being in communication with a conduit 78 which connects said opening 77 with an external conduit 79 to control the operation of clutch 71. A spring 80 tends to keep clutch 71 normally engaged so that when no fluid under pressure is available, clutch 71 will automatically engage and provide a positive connection between drive shaft 11 and drive shaft 10.

The operation of the transmission thus far described is as follows:

Assuming that the transmission is to be used in an automobile and that the automobile is standing still with the engine dead, that is, with drive shaft 10 stationary, automatic clutch 15 is disengaged and clutch 71 is engaged by spring 80 thus establishing a direct connection between driven shaft 11 and drive shaft 10. Under these conditions should the engine starter fail to operate, the engine may nevertheless be started by pushing the car since clutch 71 provides the necessary connection between shaft 11 and drive shaft 10. After the engine has been started and is idling, shift sleeve 47 may be made to assume either one of its three positions. It should be noted that said sleeve may be positioned in neutral while the engine is being started by pushing the car since the position of sleeve 47 has no bearing whatsoever upon the operation of clutch 71. Assuming, however, that sleeve 47 is in the neutral position of shaft 10 at engine idling speed will also rotate flywheel 16, clutch cover 18 and the pump drive gears 24, 25 thereby providing fluid under pressure which is conducted through conduits 79 and 78 to opening 77 to disengage teeth 73 from teeth 72 against the action of spring 80. Thus clutch 71 is disengaged when the engine is idling and remains disengaged as long as fluid pressure is available in conduit 78.

To move the car in forward direction, manual shift lever 57 is rotated clockwise as viewed in Fig. 2, thereby shifting sleeve 47 to the left as shown in Fig. 1 through the intermediary of the elements 50 to 57 inclusive. This connects intermediate shaft 43 to driven shaft 11. It is contemplated that clutch 59 is disengaged under starting conditions. It is also contemplated that brake band 42 will be tightened upon drum 41 and brake bands 37 and 39 will be disengaged subsequent to the initial engagement of teeth 44 on intermediate shaft 43 with the internal splines on sleeve 47 but before the complete engagement of these teeth with one another. The means by which these operations are accomplished will be described hereinafter. With drive shaft 10 rotating above idling speed, clutch 15 will engage automatically by the movement of weights 19 outward and the drive will be transmitted from clutch 15 to carrier 29. Since ring gear 27 is connected to intermediate shaft 43 and said shaft 43 is directly connected to driven shaft 11, the load of the vehicle will resist the turning of ring 27 and hence said ring gear 27 will function as a reaction element, thereby causing sun gear 26 to rotate in the same direction as carrier 29 but at an overspeed with respect thereto. Sun gear 26 being directly connected to pump element 30 of the torque converter 13, said pump element will then energize the fluid in the converter, the energized fluid then impinging successively upon first turbine stage 31, reaction element 34 and second turbine stage 32. Reaction element 34, however, is held against rotation by means of one-way coupling device 40 and the previously tightened brake band 42 and hence the energy of the fluid will be absorbed in turning turbine elements 31 and 32 in the same direction as pump element 30. The turning will be accompanied by increased torque because of the action of stationary reaction element 34, and this turning effort will be transmitted through one-way clutch 58 to intermediate shaft 43 where it joins the turning effort impressed upon ring gear 27 by carrier 29 and planet pinions 28. Thus a two-path drive is effected between drive shaft 10 and driven shaft 11, one of the drives being purely mechanical through carrier 29, pinion 28, ring gear 27 and intermediate shaft 43, and the remainder being hydraulic through the converter as just described. As driven shaft 11 gathers speed the torque ratio becomes closer to unity and torque converter 13 ceases to convert torque. At this stage the reaction on reaction element 34 changes its direction so that it is in a forward direction rather than reverse and hence it will begin to rotate because it is liberated by the freewheel brake 40, despite the fact that brake band 42 may still be tightened about brake drum 41.

Under direct drive conditions through the turbine 13, however, there is still a considerable loss in efficiency and accordingly clutch 59 may be operated by the controls hereinafter to be described to connect carrier 29 to driven shaft 11. To operate clutch 59 fluid is introduced into annular opening 66 which urges piston 67 against toothed annulus 61. The chamfered ends of the teeth resist engagement until substantial synchronism is effected and hence the net result of the admission of fluid under pressure into opening 66 is to compress spring 68. Upon attaining synchronism, as for example by the operator slowing down the engine, spring 68 will snap the teeth of annulus 61 into engagement with clutch teeth 60 and provide a one hundred per cent mechanical direct drive between carrier 29 and driven shaft 11 which, as previously stated, is the equivalent of a direct drive between drive shaft 10 and driven shaft 11.

It is contemplated that this transmission will be used with an automobile having a rear axle ratio of approximately 4.25 which has been standard in automobiles for many years. At, say 30 to 60 miles an hour in direct drive with a 4.25 axle the engine may be turning over faster than is necessary for the power delivered and hence an overdrive is desirable. The overdrive is provided in the present transmission as follows:

Without disturbing the setting of sleeve 47 or brake band 42, fluid pressure is removed from opening 66 so as to create an unbalanced condition tending to disengage clutch 59, and brake 37 is applied to brake drum 36 to arrest the rotation of sun gear 26. In the transition from direct drive to overdrive the direction of the torque load on teeth 61 will reverse and since said teeth 61 are already biased to disengaged position, as soon as the torque load has reached zero value clutch 59 will be disengaged. With sun gear 26 stationary and carrier 29 driving, ring gear 27 will be driven at an overspeed with respect to carrier 29 and will therefore drive intermediate shaft 43 and driven shaft 11 at an overdrive with respect to drive shaft 10. The arresting of the rotation of pump element 30 also tends to arrest the rotation of the remainder of the elements 31, 32 and 34 of the converter. This however creates no difficulty since one-way clutch 58 is designed to permit intermediate shaft 43 to rotate ahead of turbine stage 31 and reaction element 34 is expressly designed to be stationary.

Reverse is obtained by releasing brakes 37 and 42, tightening brake band 39 upon drum 38 engaging clutch 59 so as to connect carrier 29 to ring gear 27 and thereby lock up planetary gear set 14, and by shifting sleeve 47 to the right as shown in Fig. 1 to engage splines 48 with splines 45. Thus a direct drive is provided through planetary gear set 14 to pump element 30, turbine elements 31 and 32 are held against rotation and reaction element 34 is connected directly to the driven shaft 11. Under these conditions the functions of the turbine and reaction elements will be reversed and the reaction element will tend to rotate backwardly, thereby driving driven shaft 11 backward with it. Here again one-way clutch 58 breaks the drive between turbine elements 31, 32 and intermediate shaft 43 thus permitting the latter to rotate while the former do not. Since the reverse drive is transmitted through a fluid, the transmission may be shifted into reverse when going down a very steep incline, and by regulating the speed of the engine a powerful braking action may be obtained which is more effective than coasting against the engine or coasting in gear.

Referring now to Fig. 2 for a description of the hydraulic controls, it is contemplated that brake bands 37, 39 and 42 will be controlled by hydraulic pressure, brake bands 39 and 42 (corresponding to reverse and forward speed respectively) being applied by hydraulic pressure and released by spring pressure, and brake band 37 (corresponding to the overdrive control) being normally applied by spring pressure and released by hydraulic pressure. The details of the brakes are not shown since such details may be readily supplied by one skilled in this art. Thus brake band 37 is released by a piston 81 which is controlled by a valve 82, brake band 39 is tightened or applied to brake drum 38 by piston 83 which is controlled by a valve 84, and brake band 42 is applied by a piston 85 which is controlled by a valve 86. Since brakes 39 and 42 are to be operated in conjunction with the operation of shift sleeve 47 their corresponding valves are so positioned as to be operated by lever 53. In order to facilitate the engagement of the teeth of sleeve 47 with teeth 45 or 44 it is contemplated that brakes 39 and 42 will not be applied until after an initial engagement of the teeth on sleeve 47 with teeth 44 or 45. Thus valve 84 is provided with a pin 87 which is contacted by lever 53 substantially at the end of its movement toward reverse position and likewise valve 86 is provided with a pin 88 which is contacted near the end of the movement of lever 53 to its forward position.

Clutch 59 is controlled by a valve 89 under certain conditions and by valves 89 and 84 under other conditions as will be hereinafter explained.

The hydraulic circuits for the various conditions in the transmission of Fig. 1 are as follows:

Fluid is drawn from a sump through a conduit 90 by a gear type pump 91 which is driven by the shaft 92. The fluid is then pumped under a pressure determined by a pressure control valve 114 into a conduit 93 having a branch 79 leading to clutch 71 and to the converter. It then passes through valve 82 into a conduit 97 having a branch 94 leading to valve 89, a branch 95 leading to valve 84 and a branch 96 leading to valve 86. Overdrive valve 82 is controlled by means of a solenoid 98, and direct drive valve 89 is controlled by another solenoid 99. Referring to Fig. 3, solenoids 98 and 99 are connected in parallel with respect to one another and in series with respect to an electric governor switch 100 which is preferably driven by driven shaft 11 so as to be responsive to vehicle speed. Said governor switch 100 may be set to engage at any predetermined speed in the range between 15 and 20 miles per hour. Direct drive solenoid 99 is also in series with a normally closed switch 101 which is adapted to be shunted by one arm 102 of a double pole single throw switch 103 preferably mounted at the end of lever 57. The other arm 104 of switch 103 is in series with solenoid 98, both switches 101 and 103 being in series with a battery 105 and an ignition switch 106. A branch wire 107 supplies energy to the ignition circuit. Switch 101 has a pin 108 which is adapted to be contacted by an accelerator pedal 109 prior to the latter reaching full open throttle position. This prior position is shown in dotted lines at 109a and full open throttle position is shown at 109b. The purpose of this arrangement is to permit a deceleration of the engine while switch 101 is open so as to break the circuit to solenoid 99 and at the same time remove torque from the teeth of clutch 59.

When shift sleeve 47 is in neutral position lever 53 will assume the position shown in Fig. 2 and hence conduits 95 and 96 will be cut off from pistons 83 and 85 and the fluid then behind these pistons will be vented through conduits 110 and 111 respectively. Assuming that ignition switch 106 is closed and that the engine is turning over at idling speed it will be observed that fluid under pressure is conducted through valve 82 behind overdrive brake piston 81 to release brake band 37. To shift sleeve 47 to forward position, lever 57 is moved clockwise as shown in Fig. 2 thereby causing lever 53 to move counterclockwise until teeth 44 and the internal splines on sleeve 47 are in mesh. In completing the shift, lever 53 contacts and then moves pin 88 causing valve 86 to be moved to the right, thereby closing off vent opening 111 and opening pressure conduit 96 to piston 85. This causes the forward brake 42 to be applied. After the vehicle moves forward and the cut-in speed of governor 100 is reached, the circuit is completed through solenoid 99 and switches 101 and 106. This energizes solenoid 99 and causes it to move valve 89 downward, thereby closing off the vent opening through conduit 112, valve 84 and vent opening 110, and opening the pressure line 94 to the conduit 70 and clutch 59. Said clutch 59 will not engage until the accelerator pedal 109 has been raised to relieve the torque as previously described. Assuming however that accelerator pedal 109 has been so manipulated and clutch 59 is engaged, the transmission will be in direct drive as long as both switches 100 and 101 are closed. Should a sudden emergency requiring increased torque arise, however, accelerator pedal 109 is depressed to wide open throttle position and then raised slightly to a point just short of closing switch 101 thereby deenergizing solenoid 99 and allowing valve 89 to close off conduit 94 and reopen vent conduit 112 to remove the pressure from behind annular piston 67. The reversal of torque which accompanied the slight release of accelerator pedal 109 will permit release spring 65 to disengage clutch 59 and the transmission will then be in its two-path, high torque condition. This condition may obtain as long as accelerator pedal 109 remains sufficiently depressed to keep switch 101 open. To reestablish direct drive the accelerator pedal is simply raised to close switch 101 and also to again reverse the direction of torque, whereupon clutch 59 will be reengaged.

Assuming that the transmission is conditioned for direct drive operation and the operator wishes to go into overdrive, he merely operates switch 103 to close the switch arms 102 and 104 thereby rendering inoperative the downshifting switch 101 and also energizing solenoid 98. With solenoid 98 energized, valve 82 is pulled up to close off pressure conduit 93 and open brake piston 81 to a vent opening 113. Since overdrive brake band 37 is released by fluid pressure and engaged by spring pressure the venting of the pressure behind piston 81 will result in the application of brake band 37 to brake drum 36 thereby arresting the rotation of sun gear 26. The movement of valve 82 upward in response to energization of solenoid 98 dumps all fluid pressure in the system except that in conduits 79 and 93 and hence also removes the fluid pressure from behind piston 67 of clutch 59 despite the fact that solenoid 99 is still energized. Since the shift from direct drive to overdrive is accompanied by a torque reversal with reference to clutch teeth 60 and toothed annulus 61 of direct drive clutch 59, the mere application of overdrive brake 37 preceded by the venting of the pressure behind drive clutch piston 67 will effect the release of the direct drive and a shift into overdrive. While in overdrive, manipulation of kickdown switch 101 has no effect whatsoever upon the system. To change back to direct drive, as for example, to pass another vehicle, the operator opens switch 103 to deenergize solenoid 98. This restores pressure behind pistons 67 and 81 thereby releasing the overdrive brake, effecting a reversal of torque with respect to clutch teeth 60 and 61 and reengaging said teeth upon their attaining substantial synchronism.

To establish reverse drive, manual shift lever 57 is moved counterclockwise as viewed in Fig. 2 thereby effecting a clockwise movement of lever 53 and its associated mechanism to shift sleeve 47 so as to engage teeth 46 with teeth 45. After a partial engagement of said teeth, pin 87 of valve 84 is contacted by lever 53 and the completion of the shift into reverse moves valve 84 to close off vent conduit 110 and open pressure conduit 95 to piston 83. Through conduit 112 the pressure is also transmitted to valve 89 and conduit 70 to piston 67. Since the shift into reverse is made while the car is standing still and the engine is idling, there is no load on teeth 60 and hence toothed annulus 61 may be forced into engagement with teeth 60 upon the mere application of pressure. This establishes a direct drive through planetary gear set 14 and also applies reverse brake band 39 to brake drum 38, the forward brake 42 and overdrive brake 37 being disengaged. The transmission is now in condition for reverse operation.

If desired, the abovedescribed transmission may be operated with the overdrive switch 103 in closed position at all times except when a downshift is required. Direct drive would thus be omitted in the upward shift and would be used only in emergencies.

It is understood that the foregoing description is merely illustrative of a preferred embodiment of the invention. The scope of the invention, therefore, is not to be limited to the foregoing description but is to be determined by the appended claims.

I claim:

1. In a power transmitting mechanism, drive and driven shafts, a power dividing differential adapted to be connected to the drive shaft, means for transmitting a portion of the divided power from the differential to the driven shaft, a reversible infinitely variable torque multiplying device having input, forward and reverse connections, means coupling the input connection to the differential, and selective means for establishing forward or reverse drive between the driving and driven shafts including a one-way clutch for coupling the forward connection to the driven shaft, means for coupling the reverse connection to the driven shaft, and means for locking up the differential when the reverse connection is coupled to the driven shaft.

2. In a power transmitting mechanism, drive and driven shafts, a power dividing differential, a reversible infinitely variable torque multiplying device having input, forward and reverse connections, and coupling means for selectively establishing forward or reverse drive through the mechanism, said coupling means including means for connecting the differential to the drive shaft and to the input connection for both forward and reverse drives, means for connecting the differential and output connections to the driven shaft for forward drive, and means for locking up the differential and connecting the reverse connection to the driven shaft for reverse drive.

3. A power transmitting mechanism as described in claim 2, the coupling between the forward connection and driven shaft being effective only when power is transmitted by the said forward connection, and means for establishing a drive solely through the differential.

4. A power transmitting mechanism as described in claim 2, the coupling between the forward connection and driven shaft being effective only when power is transmitted through the said forward connection, and means for establishing an overdrive through the differential, said infinitely variable device being inoperative when the overdrive is established.

5. A power transmitting mechanism comprising drive and driven shafts, a power dividing differential, a hydraulic infinitely variable torque multiplying device having pump, turbine and reaction elements, and coupling means for selectively establishing forward or reverse drive through the mechanism, said coupling means including means for connecting the differential to the drive shaft and to the pump element for both forward and reverse drives, means for connecting the differential and turbine elements to the driven shaft for forward drive, and means for locking up the differential and interchanging the functions of the turbine and reaction elements for reverse drive, such that the reaction element is connected to the driven shaft in place of the turbine element and the turbine element acts as a reaction element.

6. In a power transmitting mechanism, drive and driven shafts, a variable speed differential, an infinitely variable torque multiplying device having input and output connections, means independent of said differential and device for connecting the shafts for direct drive, means for obtaining overdrive through the differential, said differential being connectible to the drive and driven shafts when overdrive is established therein, means for transmitting part of the power from the drive shaft through the differential to the driven shaft and the remainder of the power through the differential to the torque multiplying device, and one-way means for coupling said output connection of said torque multiplying device to the driven shaft, said one-way device automatically disconnecting the torque multiplying device from the driven shaft when the differential is conditioned for overdrive.

7. In a power transmitting mechanism, drive and driven shafts, a variable speed differential comprising sun, ring, planet gears and a planet gear carrier, a hydraulic torque converter comprising pump, turbine and reaction elements, means connecting the sun gear directly to the pump element, means connecting the carrier directly to the drive shaft, an intermediate shaft, means directly connecting the ring gear to the intermediate shaft, one-way means connecting the turbine element to the intermediate shaft, selective means for arresting the rotation of either the turbine element or the reaction element, clutch means for connecting the drive shaft to the intermediate shaft, and selective means for connecting either the intermediate shaft or the reaction element to the driven shaft, whereby to provide a forward drive through the mechanism when the reaction means is arrested and the intermediate shaft is connected to the driven shaft, or a reverse drive when the turbine element is arrested, the drive and intermediate shafts are connected and the reaction element is connected to the driven shaft.

8. A power transmitting mechanism as described in claim 7, and brake means for the sun gear to establish an overdrive through the planetary gear set when the selective means is conditioned for forward drive.

9. A power transmitting device including drive and driven shafts and a variable speed planetary gear mechanism comprising drive, driven and reaction elements, a clutch for connecting two elements of the planetary gear mechanism together for direct drive, a friction brake operable upon the third element for producing an overdrive, fluid means for engaging the clutch, fluid means for disengaging the brake, a valve for controlling the fluid means for the clutch, a valve for controlling the fluid means for the brake, said valves being interconnected such that both said fluid means are rendered inoperative when the brake is engaged, manually operated control means for each of said valves, the manual control means for the clutch valve being rendered ineffectual when the control means for the brake has been operated, and speed responsive control means for both valves, said speed responsive control means being in series with the manual control means.

10. A power transmitting mechanism comprising drive and driven structures, a power dividing differential, a hydraulic infinitely variable torque multiplying device having a pump element, a reaction element, and two stages of turbine elements, one stage being disposed on either side of the reaction element and both stages being connected together, and coupling means for selectively establishing forward and reverse drives through the mechanism, said coupling means including means for connecting the differential to the drive structure and to the pump element for both forward and reverse drives, means for connecting the differential and one stage of the turbine element to the driven structure and means for holding the reaction element for forward drive, and means for holding the other stage of the turbine element and connecting the reaction element to the driven structure for reverse drive.

11. A power transmitting device including drive and driven structures and a variable speed planetary gear mechanism comprising drive, driven and reaction elements, a clutch for connecting two elements of the planetary gear mechanism together for direct drive, a friction brake operable upon one element for producing an overdrive, fluid means for engaging the clutch, fluid means for disengaging the brake, a valve controlling the fluid means for the clutch, a valve for controlling the fluid means for the brake, said valves being interconnected such that both said fluid means are rendered inoperative when the brake is engaged, a solenoid for each of said valves, a manually controlled switch in series with each solenoid, a speed responsive switch, and a source of electrical energy, said solenoids and solenoid switches being in parallel with one another and in series with the speed responsive switch and source of electrical energy.

12. A power transmitting device as described in claim 11, a switch in shunt with the direct drive solenoid switch and means for closing said switch when the overdrive solenoid switch is closed.

CHARLES F. VOYTECH.